(12) United States Patent
Kim et al.

(10) Patent No.: US 9,609,675 B2
(45) Date of Patent: Mar. 28, 2017

(54) METHOD AND APPARATUS FOR MONITORING CONTROL CHANNEL

(71) Applicant: LG ELECTRONICS INC., Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/372,315

(22) PCT Filed: Jan. 16, 2013

(86) PCT No.: PCT/KR2013/000333
§ 371 (c)(1),
(2) Date: Jul. 15, 2014

(87) PCT Pub. No.: WO2013/109048
PCT Pub. Date: Jul. 25, 2013

(65) Prior Publication Data
US 2014/0376395 A1    Dec. 25, 2014

Related U.S. Application Data

(60) Provisional application No. 61/587,089, filed on Jan. 16, 2012.

(51) Int. Cl.
| | |
|---|---|
| *H04W 76/02* | (2009.01) |
| *H04L 27/26* | (2006.01) |
| *H04W 72/04* | (2009.01) |
| *H04L 5/14* | (2006.01) |
| *H04L 5/00* | (2006.01) |

(52) U.S. Cl.
CPC .......... *H04W 76/021* (2013.01); *H04L 5/001* (2013.01); *H04L 5/0053* (2013.01); *H04L 5/1469* (2013.01); *H04L 27/2602* (2013.01); *H04L 27/2627* (2013.01); *H04W 72/042* (2013.01); *H04L 5/0023* (2013.01); *H04L 5/0048* (2013.01)

(58) Field of Classification Search
None
See application file for complete search history.

(56) References Cited

U.S. PATENT DOCUMENTS

| 8,526,295 B2 * | 9/2013 | Lin ...................... H04B 7/0617 370/203 |
| 8,787,216 B2 * | 7/2014 | Yoon ..................... H04L 5/0007 370/203 |

(Continued)

FOREIGN PATENT DOCUMENTS

| WO | WO 2010/053308 A2 | 5/2010 |
| WO | WO 2011/103309 A2 | 8/2011 |

*Primary Examiner* — Jeffrey M Rutkowski
*Assistant Examiner* — Jonathan B Wood
(74) *Attorney, Agent, or Firm* — Birch, Stewart, Kolasch & Birch, LLP

(57) ABSTRACT

Provided are a method and an apparatus for monitoring a control channel in a sub-frame including a plurality of orthogonal frequency division multiplexings (OFDMs) in a time division duplex (TDD)-based wireless communication system. A wireless device monitors a downlink control channel in at least one OFDM symbol after an OFDM symbol receives a primary synchronization signal (PSS) in the sub-frame.

3 Claims, 11 Drawing Sheets

(56) References Cited

U.S. PATENT DOCUMENTS

| | | | | |
|---|---|---|---|---|
| 8,817,771 B1* | 8/2014 | Zhao | H04L 27/2678 | 370/208 |
| 8,902,935 B2* | 12/2014 | Kim | H04J 11/0079 | 370/324 |
| 8,948,110 B2* | 2/2015 | Roessel | H04L 5/001 | 370/329 |
| 9,036,572 B2* | 5/2015 | Kim | H04W 24/10 | 370/252 |
| 9,125,135 B2* | 9/2015 | Parkvall | H04W 48/08 | |
| 2009/0274109 A1* | 11/2009 | Zhang | H04L 1/1614 | 370/329 |
| 2010/0290376 A1* | 11/2010 | Dai | H04L 5/0007 | 370/294 |
| 2011/0170496 A1* | 7/2011 | Fong | H04L 5/0053 | 370/329 |
| 2011/0170631 A1* | 7/2011 | Kim | H04L 1/0606 | 375/296 |
| 2011/0228722 A1* | 9/2011 | Noh | H04L 27/2605 | 370/315 |
| 2011/0249633 A1* | 10/2011 | Hong | H04L 5/0053 | 370/329 |
| 2011/0280131 A1* | 11/2011 | Chin | H04L 5/0091 | 370/241 |
| 2011/0293037 A1* | 12/2011 | Liu | H04L 5/001 | 375/295 |
| 2011/0312319 A1* | 12/2011 | Lindoff | H04W 72/042 | 455/423 |
| 2012/0026935 A1* | 2/2012 | Park | H04L 1/1854 | 370/315 |
| 2012/0063302 A1* | 3/2012 | Damnjanovic | H04W 56/0045 | 370/228 |
| 2012/0099518 A1* | 4/2012 | Park | H04B 7/2606 | 370/315 |
| 2012/0106465 A1* | 5/2012 | Haghighat | H04W 72/1289 | 370/329 |
| 2012/0300701 A1* | 11/2012 | Uemura | H04L 5/001 | 370/328 |
| 2013/0044664 A1* | 2/2013 | Nory | H04L 1/0045 | 370/311 |
| 2013/0077560 A1* | 3/2013 | Horiuchi | H04W 72/044 | 370/315 |
| 2013/0083749 A1* | 4/2013 | Xu | H04W 74/0833 | 370/329 |
| 2013/0089065 A1* | 4/2013 | Koorapaty | H04W 56/001 | 370/330 |
| 2013/0094411 A1* | 4/2013 | Zhang | H04W 72/04 | 370/281 |
| 2013/0095838 A1* | 4/2013 | Uemura | H04W 36/30 | 455/443 |
| 2013/0107705 A1* | 5/2013 | Dinan | H04W 72/0446 | 370/230 |
| 2013/0114521 A1* | 5/2013 | Frenne | H04L 5/0053 | 370/329 |
| 2013/0121246 A1* | 5/2013 | Guey | H04W 56/001 | 370/328 |
| 2013/0178221 A1* | 7/2013 | Jung | H04L 9/0844 | 455/450 |
| 2013/0230015 A1* | 9/2013 | Hoymann | H04L 5/0053 | 370/329 |
| 2013/0301587 A1* | 11/2013 | Luo | H04W 72/02 | 370/329 |
| 2014/0092792 A1* | 4/2014 | Kim | H04L 5/0007 | 370/280 |
| 2014/0126568 A1* | 5/2014 | Berggren | H04W 56/0015 | 370/350 |
| 2014/0247808 A1* | 9/2014 | Zhang | H04L 5/003 | 370/331 |
| 2014/0286219 A1* | 9/2014 | Siomina | H04J 11/0023 | 370/311 |
| 2014/0286304 A1* | 9/2014 | Yoon | H04L 5/0007 | 370/330 |
| 2014/0334416 A1* | 11/2014 | Ko | H04L 5/0053 | 370/329 |

* cited by examiner

FIG. 9

METHOD AND APPARATUS FOR MONITORING CONTROL CHANNEL

CROSS REFERENCE TO RELATED APPLICATIONS

This application is the National Phase of PCT International Application No. PCT/KR2013/000333, filed on Jan. 16, 2013, which claims priority under 35 U.S.C. 119(e) to U.S. Provisional Application No. 61/587,089, filed on Jan. 16, 2012, all of which are hereby expressly incorporated by reference into the present application.

BACKGROUND OF THE INVENTION

Field of the Invention

The present invention relates to wireless communications, and more particularly, to a method for monitoring a control channel in a time division duplex (TDD)-based wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The 3GPP LTE supports both frequency division duplex (FDD) and time division duplex (TDD). In the FDD, an uplink (UL) transmission and a downlink (DL) transmission use different frequencies. In the TDD, the UL transmission and the DL transmission use the same frequency. A UE supporting full duplex-FDD can simultaneously perform the UL transmission and a DL reception at a specific time. A UE supporting half-duplex-FDD and TDD can perform the UL transmission and the DL reception at different times.

An available radio resource is limited in amount in a wireless communication system. Therefore, it is necessary to more effectively allocate the limited radio resource.

SUMMARY OF THE INVENTION

The present invention provides a method of monitoring a downlink control channel in a time division duplex (TDD)-based wireless communication system, and a wireless device using the method.

In an aspect, a method for monitoring a control channel in a subframe including a plurality of orthogonal frequency division multiplexing (OFDM) symbols in a time division duplex (TDD)-based wireless communication system is provided. The method includes monitoring, by a wireless device, a downlink control channel in at least one OFDM symbol located after an OFDM symbol in which a primary synchronization signal (PSS) is received in the subframe, and receiving, by the wireless device, downlink control information on the downlink control channel.

The OFDM symbol in which the PSS is received may be a 3rd OFDM symbol of the subframe.

The downlink control channel may be monitored in at least one resource block (RB) on which the PSS is received in a frequency domain.

In another aspect, a wireless device for monitoring a control channel in a subframe including a plurality of orthogonal frequency division multiplexing (OFDM) symbols in a time division duplex (TDD)-based wireless communication system is provided. The wireless device includes a radio frequency (RF) unit configured to transmit and receive a radio signal, and a processor operatively coupled to the RF unit and configured to monitor a downlink control channel in at least one OFDM symbol located after an OFDM symbol in which a primary synchronization signal (PSS) is received in the subframe, and receive downlink control information on the downlink control channel.

In still another aspect, a method for transmitting downlink control information in a subframe including a plurality of orthogonal frequency division multiplexing (OFDM) symbols in a time division duplex (TDD)-based wireless communication system is provided. The method includes transmitting, by a base station, a primary synchronization signal (PSS) in a 3rd OFDM symbol in the subframe, and transmitting, by the base station, the downlink control information on a downlink control channel in at least one OFDM symbol located after the 3rd OFDM symbol in the subframe.

An additional radio resource for a downlink control channel can be ensured.

BRIEF DESCRIPTION OF THE DRAWINGS

FIG. 9 shows a location of a demodulation reference signal (DM RS) in a special subframe.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc.

The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
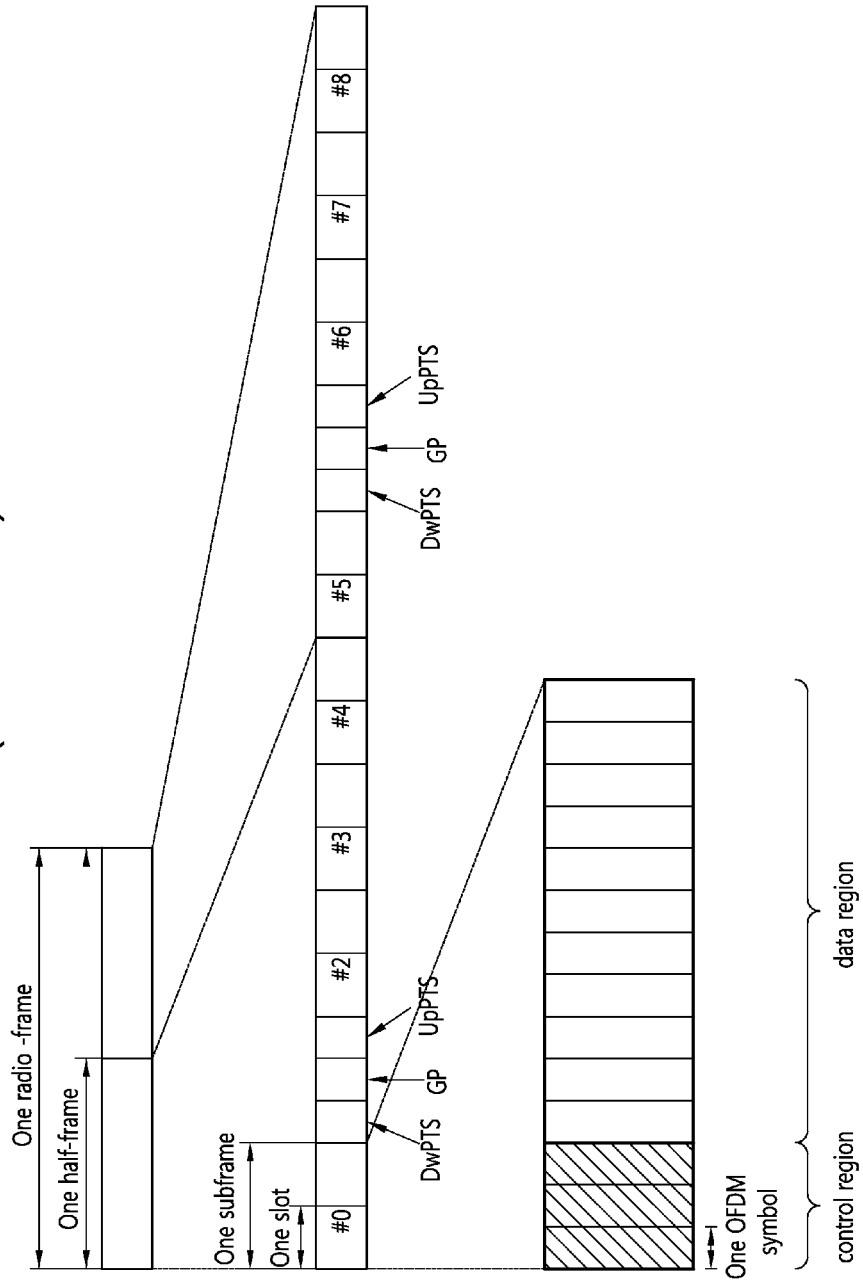
FIG. 1 shows a structure of a downlink (DL) radio frame in $3^{rd}$ generation partnership project (3GPP) long term evolution-advanced (LTE-A).

FIG. 1 shows a downlink radio frame structure in $3^{rd}$ generation partnership project (3GPP) long term evolution (LTE). The section 4 of 3GPP TS 36.211 V10.2.0 (2011-06) "Evolved Universal Terrestrial Radio Access (E-UTRA); Physical Channels and Modulation (Release 10)" can be incorporated herein by reference, and this is for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7x 12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, in 3GPP LTE/LTE-A, a physical control channel includes a physical downlink control channel (PDCCH), a physical control format indicator channel (PCFICH), and a physical hybrid-ARQ indicator channel (PHICH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

Figure 2:
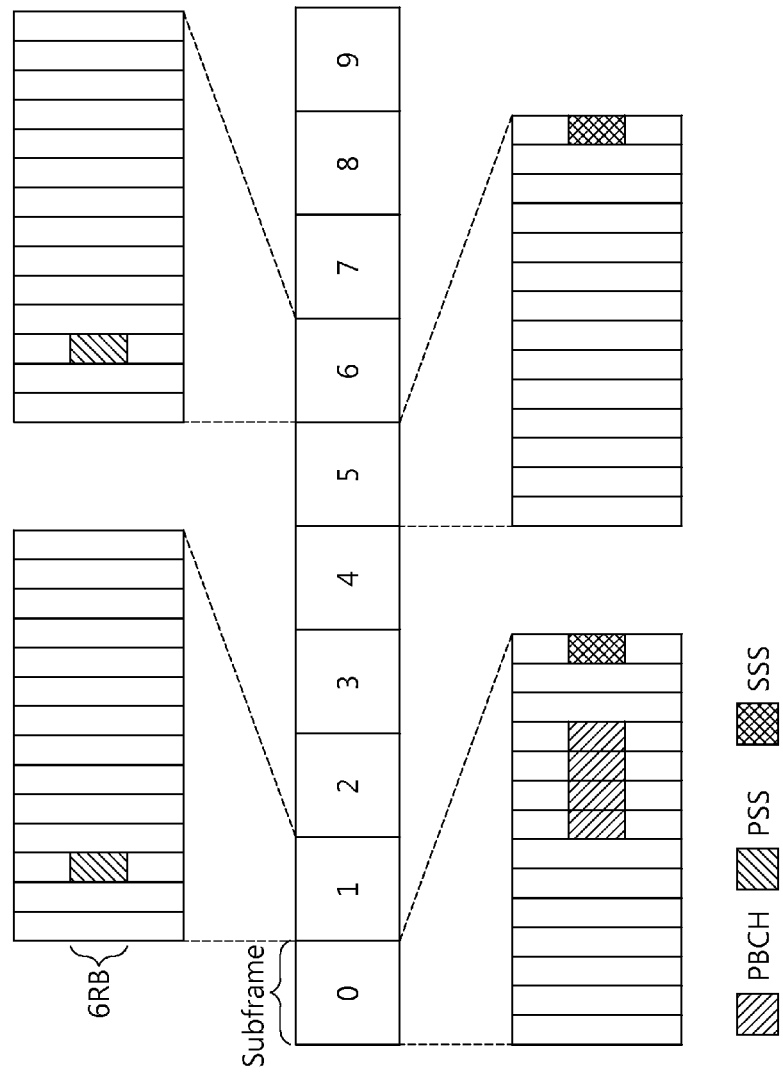
FIG. 2 shows a synchronization signal and physical broadcast channel (PBCH) transmission in time division duplex (TDD).

FIG. 2 shows a synchronization signal and physical broadcast channel (PBCH) transmission in TDD.

A physical broadcast channel (PBCH) is transmitted in four preceding OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

A primary synchronization signal (PSS) is transmitted in a $3^{rd}$ OFDM symbol of a $2^{nd}$ subframe (i.e., a subframe indexed with 1) and a $7^{th}$ subframe (i.e., a subframe indexed with 6). The PSS is used to attain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to the cell ID.

A secondary synchronization signal (SSS) is transmitted in a last OFDM symbol of a $1^{st}$ subframe (i.e., a subframe indexed with 0) and a $6^{th}$ subframe (i.e., a subframe indexed with 5). A $1^{st}$ SSS is transmitted in a last OFDM symbol of the $1^{st}$ subframe, and a $2^{nd}$ SSS is transmitted in a last OFDM symbol of the $6^{th}$ subframe. The SSS is used to attain frame synchronization. The SSS is used to attain a cell ID together with the PSS. The $1^{st}$ SSS and the $2^{nd}$ SSS use different secondary synchronization codes (SSCs). If the $1^{st}$ SSS and the $2^{nd}$ SSS each include 31 subcarriers, sequences of two SSCs with a length of 31 are respectively used for the $1^{st}$ SSS and the $2^{nd}$ SSS.

From a perspective of a frequency domain, the PBCH, the PSS, and the SSS are transmitted within 6 RBs about a center of the subframe.

Hereinafter, a transmission of PDCCH and a reference signal is disclosed.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 3:
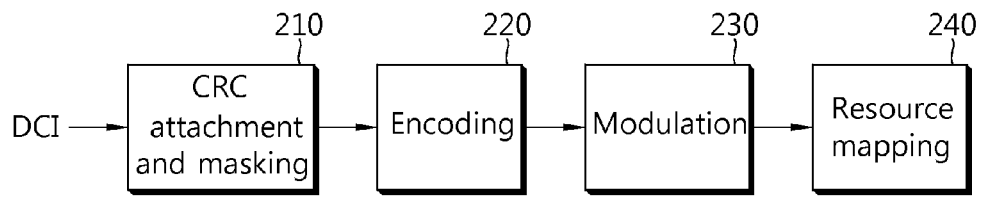
FIG. 3 is a block diagram showing a configuration of a physical downlink control channel (PDCCH).

FIG. 3 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 4:
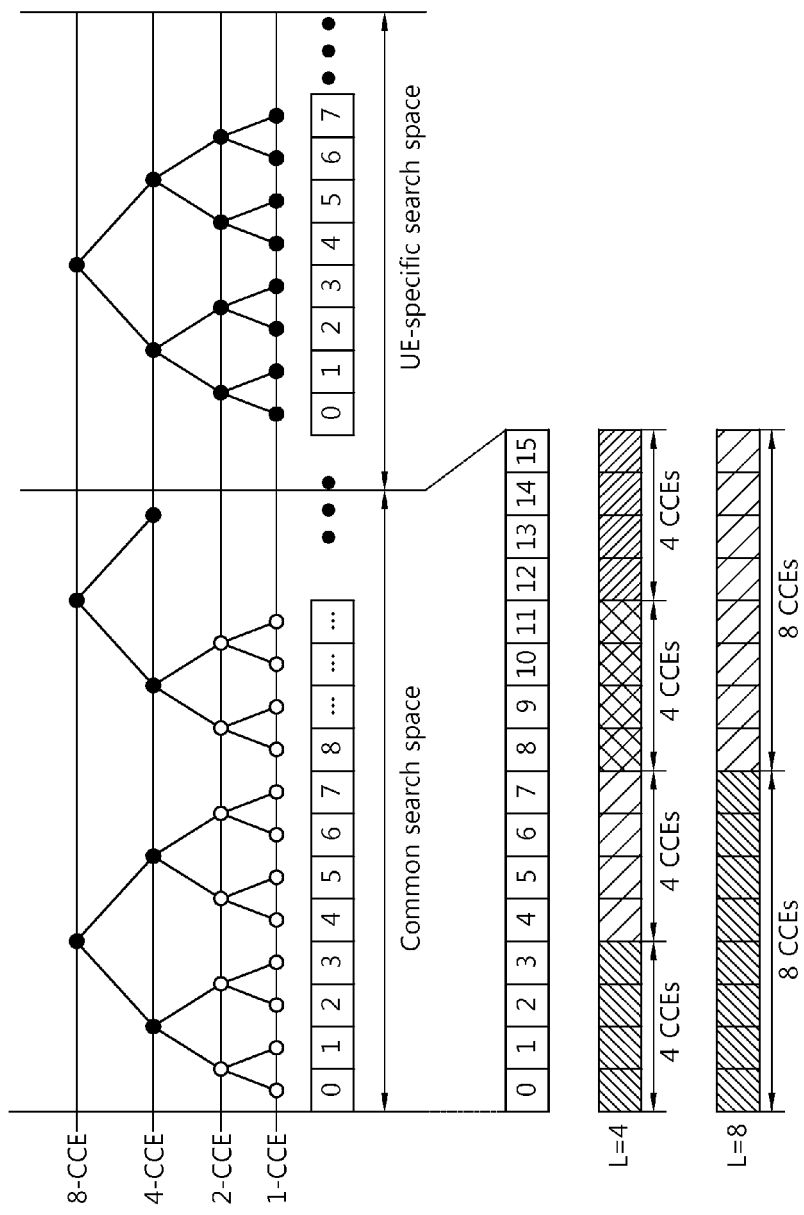
FIG. 4 shows an example of monitoring a PDCCH.

FIG. 4 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 2 shows the number of PDCCH candidates monitored by the wireless device.

TABLE 2

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k-1}$. $M^{(L)}$ denotes the number of PDCCH candidates in a CCE aggregation level L of a given search space.

If a carrier indicator field (CIF) is set to the wireless device, $m'=m+M^{(L)}n_{cif}$. Herein, $n_{cif}$ is a value of the CIF. If the CIF is not set to the wireless device, $m'=m$.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1}=n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH.

Figure 5:
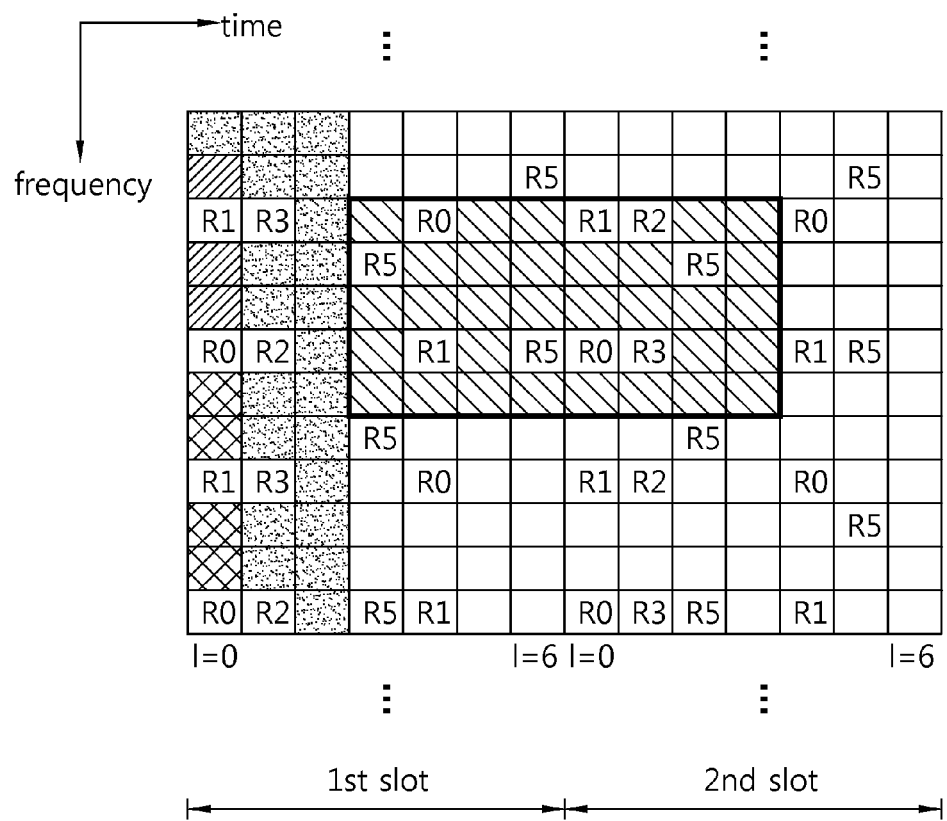
FIG. 5 shows an example of arranging a reference signal and a control channel in a DL subframe of 3GPP LTE.

FIG. 5 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, $m=0, 1, \ldots, 2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 4]}$$

Herein, Nc=1600, and a first m-sequence is initialized as $x_1(0)=1$, $x_1(n)=0$, $m=1, 2, \ldots, 30$.

A second m-sequence is initialized as $c_{init}=2^{10}(7(ns+1)+1+1)(2N^{cell}_{ID}+1)+2 N^{cell}_{ID}+N_{CP}$, at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=$(floor(ns/2)+1)(2 $N^{cell}_{ID}$+1)$2^{16}$+$n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$(floor(ns/2)+1)(2 $N^{cell}_{ID}$+1)$2^{16}$+$n_{SCID}$ at a start of each subframe. $n_{SCID}$ is a parameter acquired from a DL grant (e.g., a DCI format 2B or 2C) related to PDSCH transmission.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
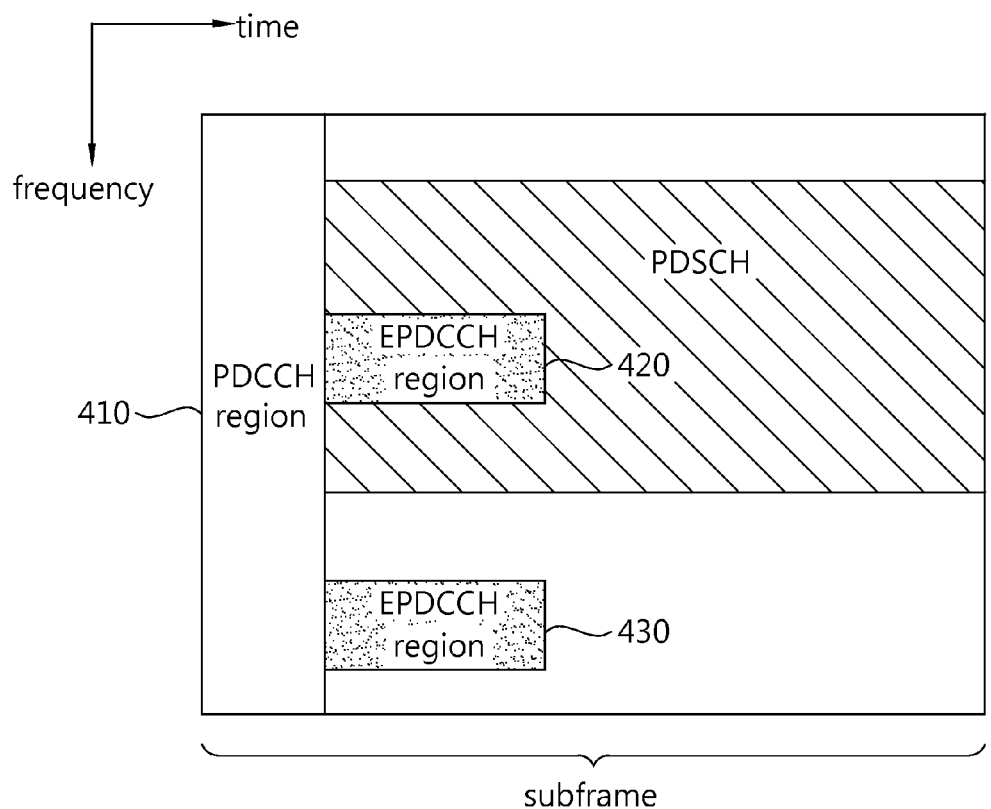
FIG. 6 is an example of a subframe having an enhanced PDCCH (EPDCCH).

FIG. 6 is an example of a subframe having an EPDCCH.

A subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}$=(floor(ns/2)+1) $(2 N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

An EPDCCH search space may corresponds to an EPDCCH region. One or more EPDCCH candidates may be monitored at one or more aggregation levels in the EPDCCH search space.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

Figure 7:
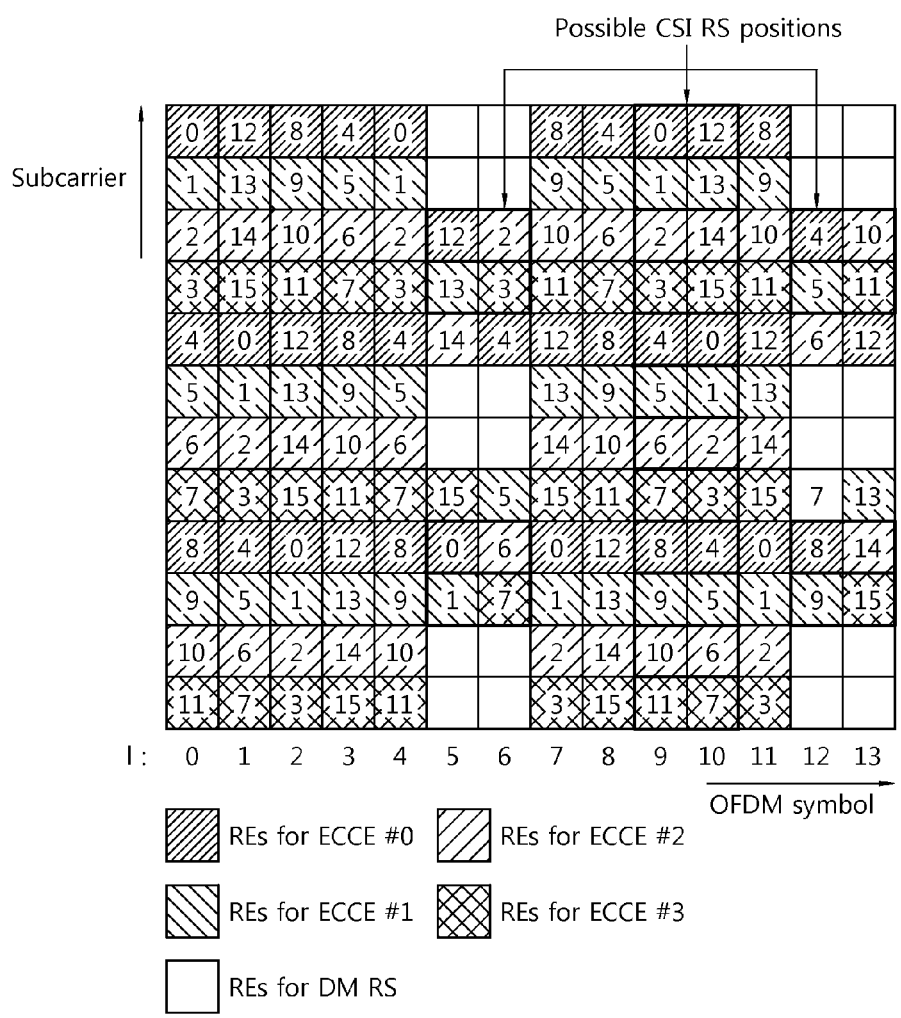
FIG. 7 shows an example of a physical resource block (PRB) pair.

FIG. 7 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 6, an RE index may be assigned sequentially starting from a first subcarrier of a first OFDM symbol (l=0). Assume that 16 EREGs are indexed from 0 to 15. In this case, 9 REs having an RE index 0 are assigned to an EREG 0. Likewise, 9 REs corresponding to an RE index k 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2-{EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 6 that an ECCE #0 includes an EREG group #0, an ECCE #1 includes an EREG group #1, an ECCE #2 includes an EREG group #2, and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

Now, a problem of the conventional technique and a resource allocation of the proposed EPDCCH will be described.

Figure 8:
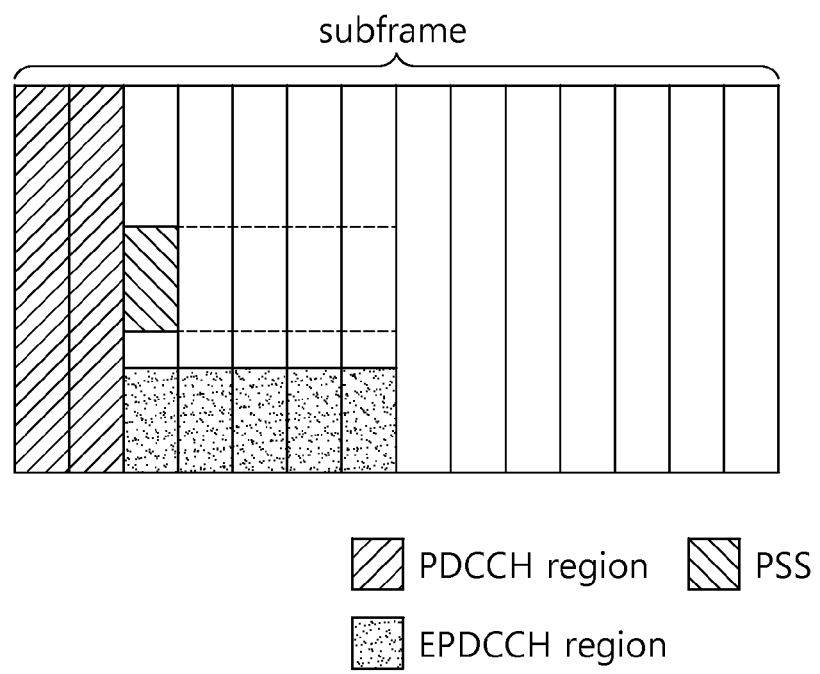
FIG. 8 shows a problem caused by the conventional technique.

FIG. 8 shows a problem caused by the conventional technique.

As described above, in a TDD system, a PSS is transmitted in a $3^{rd}$ OFDM symbol of subframes #1 and #6. In this case, a PDCCH region may be placed across up to two OFDM symbols.

The PSS is transmitted in 6 RBs in a center of a frequency domain, and resources are not allocated for any channel in the 6 RBs after a $4^{th}$ OFDM symbol. That is, in the 6 RBs in which the PSS is transmitted (such RBs are called exclusive RBs), data is not transmitted in an OFDM symbol after the PSS. A PDSCH is not allocated from the 4$^{th}$ OFDM symbol to a last OFDM symbol of a corresponding slot (or a corresponding subframe).

As shown in Table 1, the subframes #1 and #6 may be special subframes or DL subframes according to a UL-DL configuration. In particular, the subframe #6 is a DL subframe in UL-DL configurations 3, 4, and 5.

If a PDSCH/EPDCCH is not transmitted in a corresponding exclusive RB only because the PSS exists in the subframe #6, it may cause waste of a radio resource.

According to the proposed embodiment, it is proposed to allocate an EPDCCH region to the entirety or part of the exclusive RB. The aforementioned EPDCCH resource allocation (e.g., PRB pair, ECCE, etc.) may be applied to the exclusive RB, and a wireless device may monitor the EPDCCH in the exclusive RB.

It is not that the EPDCCH is allocated only in the exclusive RB. A part of the EPDCCH region may occupy the part or entirety of the exclusive RB, and the remaining parts of the EPDCCH region may occupy an RB other than the exclusive RB.

In one embodiment, a case where the EPDCCH region is allocated to the exclusive RB may be limited to a case where the subframe #6 is configured to the DL subframe. The wireless device may monitor the EPDCCH in the exclusive RB when the subframe #6 is configured to the DL subframe.

When the subframe #6 is configured to the special subframe, the EPDCCH region may not be allocated in the exclusive RB.

In another embodiment, the EPDCCH region may be allocated even if the subframe #6 is configured to the special subframe. The wireless device may monitor the EPDCCH in the exclusive RB when the subframe #6 is configured to the special subframe.

However, if the subframes #1 and #6 are configured to the special subframes, there is a need to consider a location of a DM RS.

Figure 9:
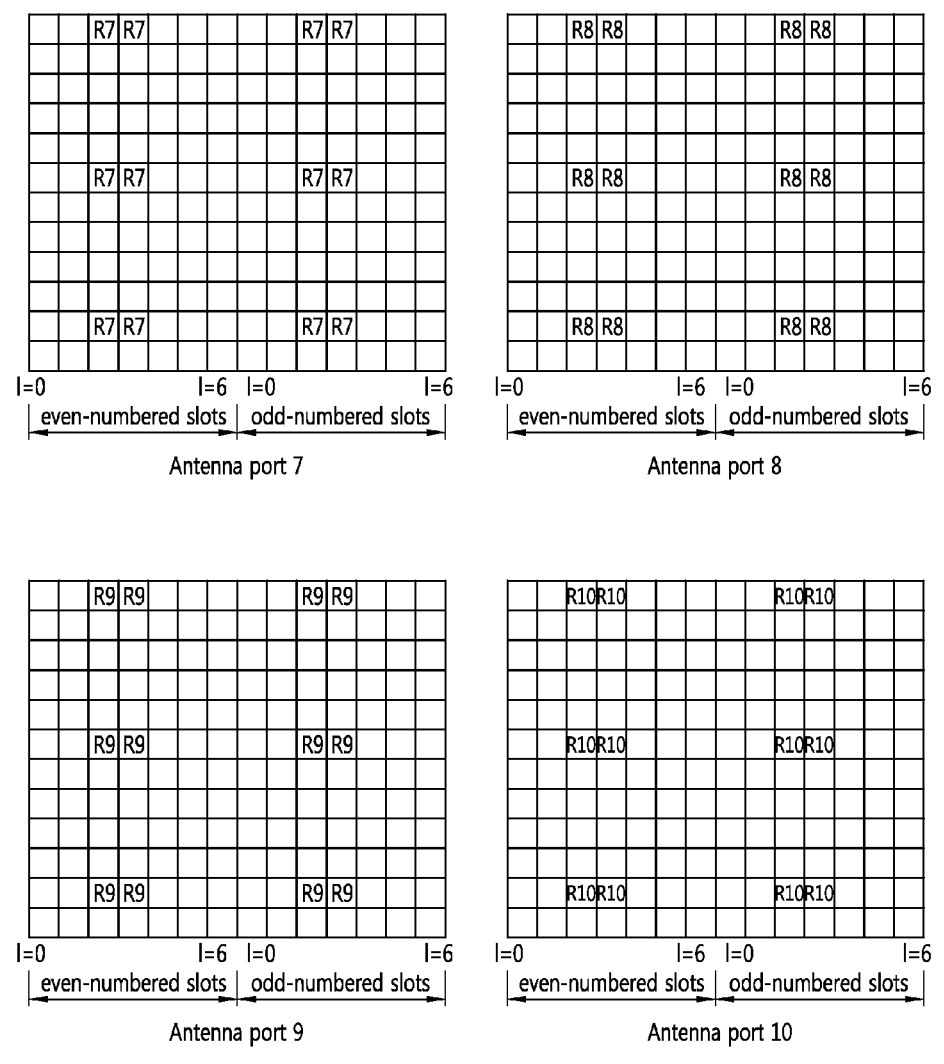

FIG. 9 shows a location of a DM RS in a special subframe. The location of the DM RS in the special subframe is shown for a case of a UL-DL configuration 3, 4, or 8.

The DM RS is transmitted through each of 4 antenna ports (i.e., antenna ports 7, 8, 9, and 10), and it is shown herein that the DM RS is transmitted in a 3$^{rd}$ OFDM symbol. R7 denotes a DM RS at the antenna port 7. R8 denotes a DM RS at the antenna port 8. R9 denotes a DM RS at the antenna port 9. R10 denotes a DM RS at the antenna port 10. The number of the antenna ports or an index thereof are for exemplary purposes only.

Therefore, when a PSS is transmitted in a special subframe, a DM RS cannot be transmitted in the 3$^{rd}$ OFDM symbol, which may lead to a difficulty in EPDCCH demodulation.

Figure 10:
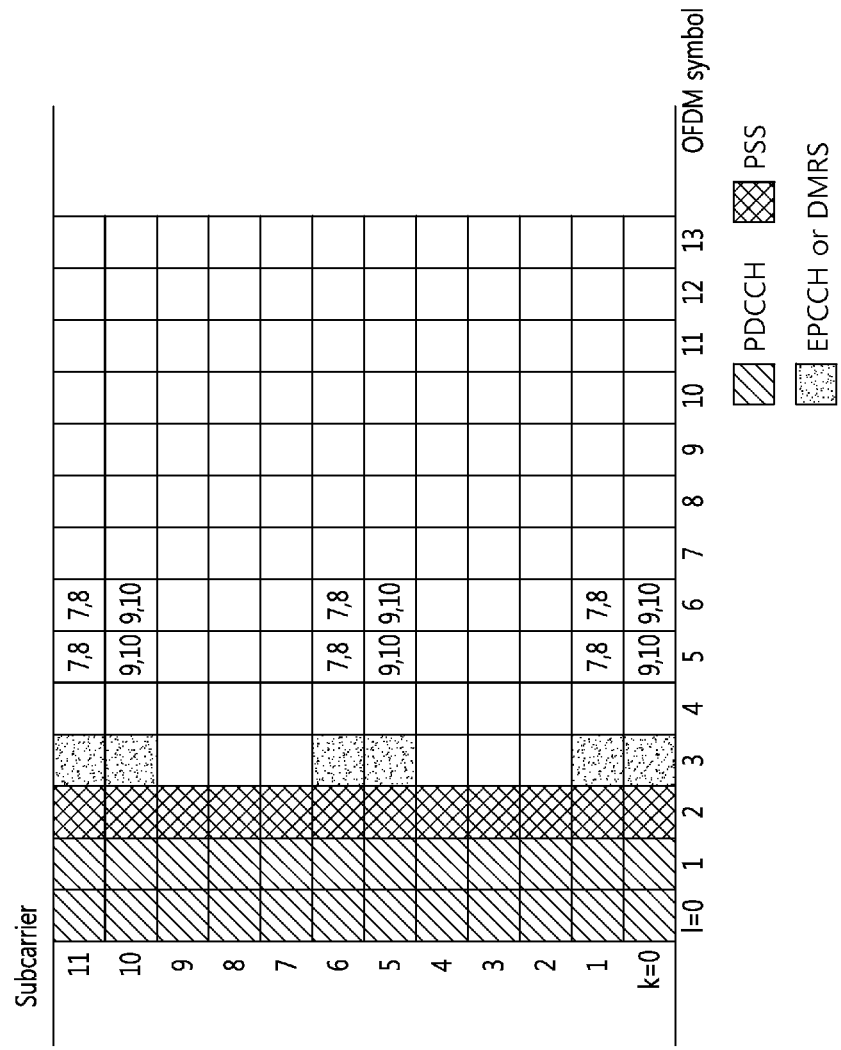
FIG. 10 shows a resource allocation for a control channel according to an embodiment of the present invention.

FIG. 10 shows a resource allocation for a control channel according to an embodiment of the present invention.

It is assumed that a PSS is transmitted in a 3$^{rd}$ OFDM symbol in a special subframe.

Since a DM RS cannot be transmitted in the 3$^{rd}$ OFDM symbol, a transmission of the DM RS may be discarded in a 4$^{th}$ OFDM symbol, and an EPDCCH region may be allocated to an RE for the DM RS. A wireless device may monitor an EPDCCH under the assumption that the DM RS is not transmitted in an RE overlapping with the PSS. The wireless device may monitor the EPDCCH on the basis of a 2$^{nd}$ DM RS group (i.e., DM RSs transmitted in a 10$^{th}$ OFDM symbol and a 11$^{th}$ OFDM symbol, see FIG. 9). A 1$^{st}$ DM RS group refers to DM RSs transmitted in the 3$^{rd}$ OFDM symbol and the 4$^{th}$ OFDM symbol.

The DM RS may be transmitted in the 4$^{th}$ OFDM symbol not overlapping with the PSS. If only one antenna port is used in one DM RS group, the DM RS in the 4$^{th}$ OFDM symbol may be used for EPDCCH monitoring. For example, only one of antenna ports 7 and 8 may be utilized in the EPDCCH monitoring.

If the 1$^{st}$ DM RS group is not entirely used, since the 2$^{nd}$ DM RS group is located in a rear portion in a subframe, there may be a deterioration of channel estimation capability. A location of the 1$^{st}$ DM RS group may be changed in a special subframe in which a PSS is transmitted. REs indicated by (7,8) and (9,10) in FIG. 10 may be new REs for the 1$^{st}$ DM RS group.

The aforementioned operation may apply only to an exclusive RB colliding with a PSS, and the conventional operation may be kept without alteration in an RB not colliding with the PSS. Alternatively, the aforementioned operation may apply to all RBs in a specific subframe.

Figure 11:
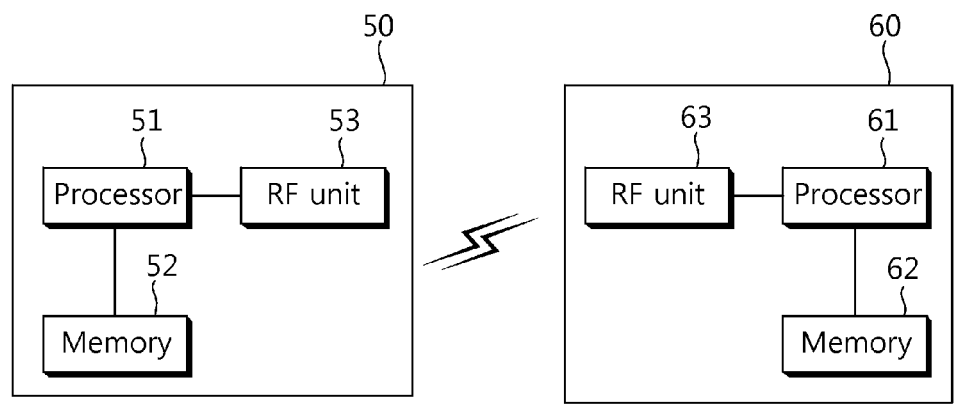
FIG. 11 is a block diagram of a wireless communication system according to an embodiment of the present invention.

FIG. 11 is a block diagram of a wireless communication system according to an embodiment of the present invention.

A BS 50 includes a processor 51, a memory 52, and a radio frequency (RF) unit 53. The memory 52 operatively coupled to the processor 51 stores a variety of information for driving the processor 51. The RF unit 53 operatively coupled to the processor 51 transmits and/or receives a radio signal. The processor 51 implements the proposed functions, procedure, and/or methods. In the aforementioned embodiment, an operation of the BS may be implemented by the processor 51. The processor 51 may configure an EPDCCH search space in one or more PRB pairs, and may transmit an EPDCCH and/or a PSS.

A wireless device 60 includes a processor 61, a memory 62, and an RF unit 63. The memory 62 operatively coupled to the processor 61 stores a variety of information for driving the processor 61. The RF unit 63 operatively coupled to the processor 61 transmits and/or receives a radio signal. The processor 61 implements the proposed functions, procedure, and/or methods. In the aforementioned embodiment, an operation of the wireless device may be implemented by the processor 61. The processor 61 may monitor an EPDCCH in an EPDCCH search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring an enhanced physical downlink control channel (EPDCCH) in a subframe including a plurality of orthogonal frequency division multiplexing (OFDM) symbols in a time division duplex (TDD)-based wireless communication system, the method comprising:
receiving a primary synchronization signal (PSS) in 6 resource blocks (RBs) and on a $3^{rd}$ OFDM symbol of the subframe;
monitoring, by a wireless device, the EPDCCH in the 6 RBs and on at least one OFDM symbol located after the $3^{rd}$ OFDM symbol where the PSS is received; and
receiving a demodulation reference signal (DMRS) to demodulate the EPDCCH,
wherein when the DMRS is received in the 6 RBs and on the subframe where the PSS is received and when the subframe corresponds to a TDD-based special subframe, a location of the DMRS is changed from a $3^{rd}$ to a $6^{th}$ symbol and from a $4^{th}$ to a $7^{th}$ symbol.

2. The method of claim 1, wherein the subframe is a $7^{th}$ subframe in a radio frame including 10 subframes.

3. A wireless device for monitoring an enhanced physical downlink control channel (EPDCCH) in a subframe including a plurality of orthogonal frequency division multiplexing (OFDM) symbols in a time division duplex (TDD)-based wireless communication system, the wireless device comprising:
a radio frequency (RF) unit configured to transmit and receive a radio signal;
and a processor operatively coupled to the RF unit and configured to:
receive a primary synchronization signal (PSS) in 6 resource blocks (RBs) and on a $3^{rd}$ OFDM symbol of the subframe;
monitor the EPDCCH in the 6 RBs and on at least one OFDM symbol located after the $3^{rd}$ OFDM symbol where the PSS is received, and
receive a demodulation reference signal (DMRS) to demodulate the EPDCCH,
wherein when the DMRS is received in the 6 RBs and on the subframe where the PSS is received and when the subframe corresponds to a TDD-based special subframe, a location of the DMRS is changed from a $3^{rd}$ to a $6^{th}$ symbol and from a $4^{th}$ to a $7^{th}$ symbol.

* * * * *